United States Patent
Subag et al.

(10) Patent No.: US 9,218,679 B2
(45) Date of Patent: Dec. 22, 2015

(54) REDUCED BITCOUNT POLYGON RASTERIZATION

(71) Applicant: INTEL CORPORATION, Santa Clara, CA (US)

(72) Inventors: Jacob Subag, Kiryat Haim (IL); Nir Benty, Nahariya (IL)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 13/647,071

(22) Filed: Oct. 8, 2012

(65) Prior Publication Data
US 2014/0098084 A1      Apr. 10, 2014

(51) Int. Cl.
| G06T 15/00 | (2011.01) |
|---|---|
| G06T 11/40 | (2006.01) |
| G06T 15/10 | (2011.01) |

(52) U.S. Cl.
CPC .............. *G06T 11/40* (2013.01); *G06T 15/10* (2013.01); *G06T 2210/12* (2013.01)

(58) Field of Classification Search
CPC ............ F16D 2121/02; F16D 2123/00; F16D 65/567; G06T 11/40; G06T 15/10; G06T 2210/12
See application file for complete search history.

(56) References Cited

U.S. PATENT DOCUMENTS

| 6,407,736 | B1 | 6/2002 | Regan |
|---|---|---|---|
| 6,498,607 | B1 | 12/2002 | Pfister et al. |
| 6,765,576 | B2 | 7/2004 | Nelson |
| 2003/0122850 | A1 | 7/2003 | Koneru et al. |
| 2003/0174133 | A1* | 9/2003 | Shehane et al. ............... 345/420 |
| 2003/0234792 | A1 | 12/2003 | Junkins et al. |
| 2008/0024497 | A1* | 1/2008 | Crow et al. ................... 345/428 |
| 2009/0219285 | A1 | 9/2009 | Reshetov |
| 2014/0267238 | A1* | 9/2014 | Lum et al. ..................... 345/419 |

OTHER PUBLICATIONS

International Search Report and Written Opinion dated Jan. 22, 2014 for International Application No. PCT/US2013/061166, 11 pages.

* cited by examiner

*Primary Examiner* — Kee M Tung
*Assistant Examiner* — Frank Chen
(74) *Attorney, Agent, or Firm* — Finch & Maloney PLLC

(57) ABSTRACT

Techniques are disclosed for carrying out rasterization of a given graphics workload, wherein portions of the workload associated with relatively high bit count operations are processed via a first process path, and portions of the workload associated with relatively lower bit count operations are processed via a second, relatively faster process path, in accordance with an embodiment. In a more general sense, maximal bit count associated with a given primitive can be identified and compared to a threshold to determine which one of multiple available processing paths can be used.

21 Claims, 5 Drawing Sheets

REDUCED BITCOUNT POLYGON RASTERIZATION

BACKGROUND

Generally, the field of three-dimensional computer graphics is concerned with generating and displaying three-dimensional objects in a two-dimensional space, such as a display screen. This is accomplished by converting information about three-dimensional objects into a bit map that is displayed. This so-called rendering process is a multi-part process by which a computer turns an application model description of an image into a screen image. The basic idea is that the processing of information in three-dimensional computer graphics occurs in a series of stages in a graphics pipeline, where each stage generates results for a successive stage.

One type of rendering employs rasterization. In general, rasterization is the process of converting an image described in a vector graphics format (shapes) into a raster image (pixels or dots). The resulting output maybe provided to a display or printer, or saved as a bitmap file, for example. A typical rasterization algorithm receives a three-dimensional scene described as polygons, and renders that scene onto a two-dimensional display. Each polygon is represented as a collection of triangles, and the triangles are each represented by three vertices in three-dimensional space. In this sense, a rasterizer receives a stream of triangle vertices, transforms them into corresponding two-dimensional points on a surface, and fills in the transformed two-dimensional triangles as needed.

DETAILED DESCRIPTION

Figure 1:
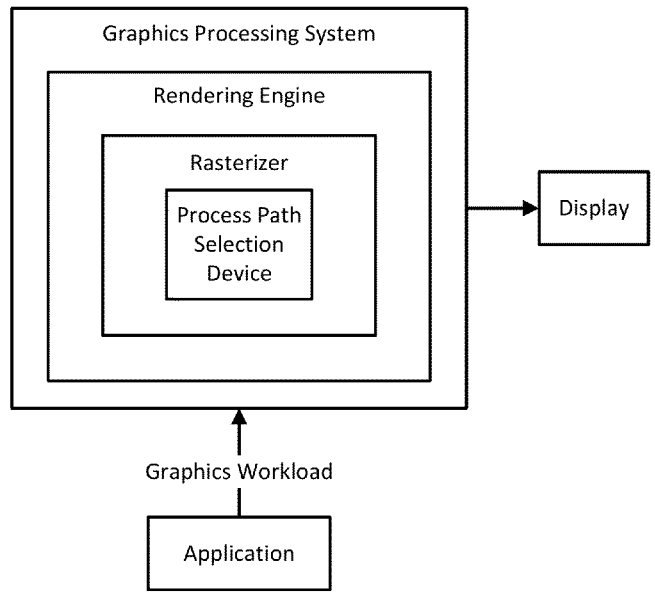
FIG. 1 illustrates a graphics processing system configured to carry out polygonal rasterization in accordance with an embodiment of the present invention.

Techniques are disclosed for carrying out rasterization of a given graphics workload, wherein portions of the workload associated with relatively high bit count operations are processed via a first process path, and portions of the workload associated with relatively lower bit count operations are processed via a second, relatively faster process path. In a typical workload, and in accordance with an embodiment, most rasterization processing operations can be executed using the faster process path. For instance, in some embodiments, rasterization processing operations that can be executed using the faster process path are in excess of 90% of the received graphics workload, or 95%, or 99%, in many cases. Thus, by identifying those cases where a faster processing path (e.g., 32-bit operations path, as opposed to, for instance, a 40-bit or 64-bit operations path) will be sufficient, and then selecting the appropriate processing path, a significant improvement in processing efficiency and power consumption can be achieved. In a more general sense, maximal bit count associated with a given primitive can be identified and compared to a threshold to determine which one of multiple available processing paths can be used.

General Overview

As previously explained, a rasterizer generally receives a stream of triangle vertices, transforms them into corresponding two-dimensional points on a surface, and fills in the transformed two-dimensional triangles as needed. In more detail, the application model for a given object is typically created by an application program, and stored in an application database. Using a graphics application programming interface (API), the application program converts the application model to a sequence of commands, which are then processed by the graphics pipeline to generate a view of the model. The graphics API typically includes a series of graphics output subroutines or commands that contain both a detailed geometric description of what is to be viewed and the attributes describing how the objects should appear (e.g., size, color, texture, width, etc), and other elements, which are all collected in a graphics package that can be called from high-level languages such as C, C++, object-oriented C, Pascal, LISP, etc. During rasterization, a primitive that is defined by three-dimensional parameters in a three-dimensional representation is transformed into a two-dimensional raster of pixels. Three-dimensional parameters comprise x, y, and z coordinates, and may optionally comprise parameters such as color and texture. During the transformation process, a three-dimensional coordinate comprising an X, Y, and Z value is transformed into an X and Y screen coordinate used for positioning, and a depth value Z, that is treated as a parameter. During rasterization, a set of parameter values are given for each of the three triangle vertices. One of the problems to be solved during the rasterization process is computing the three-dimensional parameters, such as the Z parameter, color parameter, and texture parameter, corresponding to the coordinates to most closely approximate the three-dimensional primitive. Rasterization makes these determinations by computing the parameter values at each pixel while scanning the horizontal or vertical scan lines of the pixel grid. There a number of non-trivial issues associated with known rasterization techniques. For instance, during rasterization, the query to check if a sample is covered by a triangle (or other primitive) is invoked extensively by the graphics pipeline. Such queries are usually calculated with 3 half-plane tests, and require multiplications which can result in 32.16 (48 bits) numbers. However, common graphics APIs typically define the rasterization precision required as using fixed point 16.8 (24 bits) numbers. In addition, typical graphics systems use fixed-function hardware with 40-bit operations, and software rasterizers use 64-bit operations. To this end, depending on the workload, the rasterization process can be a costly and inefficient process, sometimes requiring many multiplication computations.

Thus, and in accordance with an embodiment of the present invention, rasterization techniques are provided wherein a given graphics workload is evaluated prior to or during rasterization to assess the requisite bit count of an operation. If the bit count is over a given threshold, then the workload can be processed using a slower processing path that can accommodate higher bit operations. On the other hand, if the bit count is at or below the given threshold, then the workload can be processed using a relatively faster processing path that can accommodate lower bit operations. For example, and as will be appreciated in light of this disclosure, for fixed-function hardware, using 32-bit operations instead of 40-bit operations may reduce area and power consumption. In a similar fashion, for software rasterizers, using 32-bit operations instead of 64-bit operations may increase performance of the graphics pipeline and reduce power consumption.

The techniques are based on a number of observations. For instance, and as will be appreciated in light of this disclosure, sample points outside a triangle's bounding box can be trivially rejected before/during rasterization, such that half-plane tests only need to be done for the set of samples within the triangle's bounding box. In addition, the number of bits needed for the half-plane tests can be bounded before rasterization—such testing is valid for all sample points in a given triangle during the current draw-call. In one example embodiment, for instance, if this bound doesn't exceed 32 bits, then normal 32-bit variables can be used (while shifting values as needed during rasterization). In cases where the bound exceeds 32 bits, then 64-bit operations in software rasterizers can be used and/or programmable hardware in hardware rasterizers.

As will be appreciated in light of this disclosure, while example bit operations such as 32-bit operations are provided herein (e.g., $BitOp_{Threshold} \leq 32$), the techniques can be applied to any number bit operations (e.g. 24 bits, 16 bits, etc), and the claimed invention is not intended to be limited to any particular bit operation threshold unless expressly stated. Likewise, while example polygonal primitives such as triangles are provided herein, the techniques can be applied to any planar polygon by first segmenting or otherwise dividing it into triangles, and the claimed invention is not intended to be limited to any particular primitive shape unless expressly stated.

System Architecture and Methodology

FIG. 1 illustrates a graphics processing system configured to carry out polygonal rasterization in accordance with an embodiment of the present invention. As can be seen, the system includes a rendering engine which includes a rasterizer. The rasterizer is configured with a process path selection device. In operation, a given application accesses the system and provides graphics workload which may include, for example, one or more commands and/or graphic data to be processed by the system, which in turn generates an output to the display device.

As will be appreciated, not all typical components and functional modules of a graphics processing system are shown, such as a graphics processing unit (GPU), blitter engine, and media engine. Further note that different embodiments may have different degrees of componentry/module integration. For instance, the process path selection device may be implemented as a discrete component/module on the input of the rasterizer, or integrated into the rasterizer. Alternatively, the process path selection device may be implemented partially within the rasterizer and partially in one or more other components in communication with the rasterizer. Numerous other such variations and embodiments will be apparent in light of this disclosure, and the claimed invention is not intended to be limited to the specific examples depicted in the figures.

The given application can be any application that generates commands suitable for execution by a graphics processing system. The workload can be passed from the application to the system as conventionally done or with a custom or otherwise proprietary protocol if so desired. In other embodiments, the application may communicate with one or more intervening modules and/or components one or more of which in turn communicate with the system. Such application details will vary greatly from one embodiment of the next and are not intended to limit the claimed invention.

The rasterizer-based rendering engine can be implemented using any number of known and/or custom techniques and architecture, so as to allow for typical rasterization processes to be carried out. However, in addition to such conventional/custom functionality and architecture, the rasterizer is further programmed and/or otherwise configured with the process path selection device, which in one embodiment is configured for assessing which portions of the workload (if any) are associated with relatively high bit count operations, and which portions of the workload are associated with relatively lower bit count operations, and then providing those workload portions to the appropriate processing path of the rasterizer. The bit count threshold can be, for example, a configurable parameter set by the user, or can be set to a predetermined value suitable for a given application. The process path selection device will be discussed with reference to FIG. 2.

Figure 2:
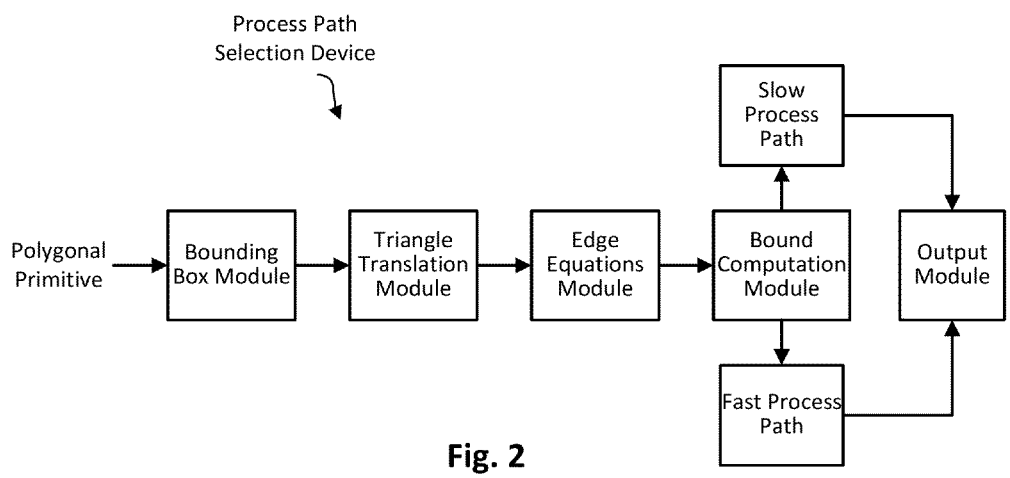
FIG. 2 illustrates a process path selection device of the system shown in FIG. 1, configured in accordance with an embodiment of the present invention.
Figure 3:
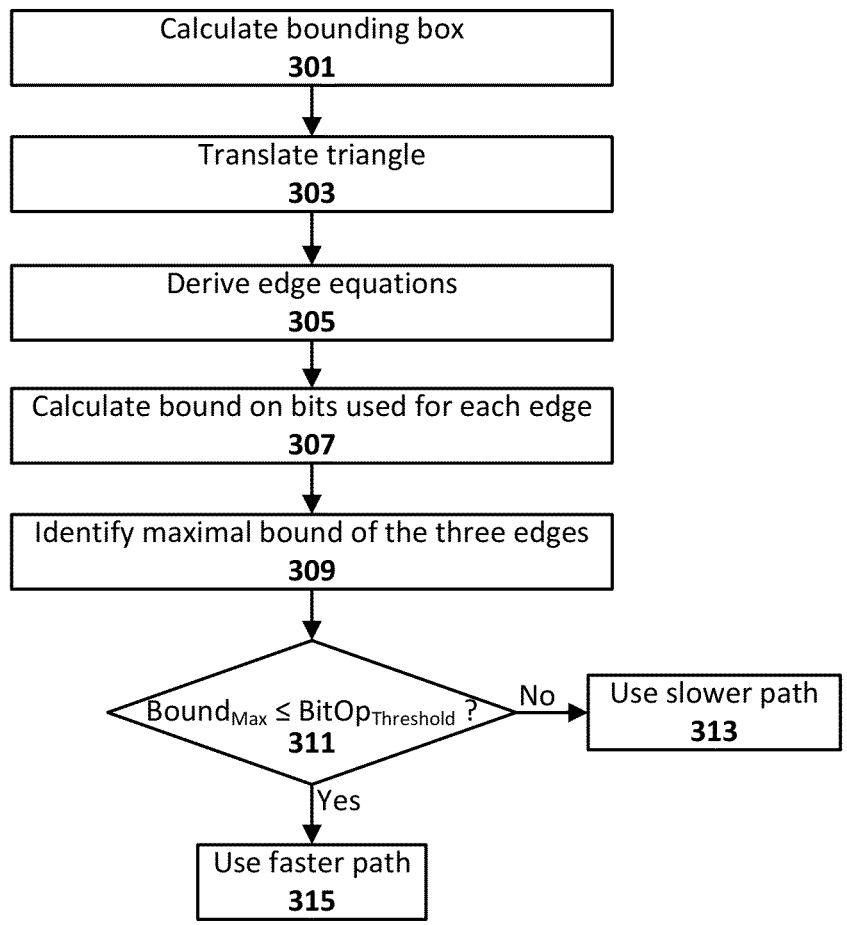
FIG. 3 illustrates a polygonal rasterization method configured in accordance with an embodiment of the present invention.

FIG. 2 illustrates a process path selection device of the system shown in FIG. 1, configured in accordance with an embodiment of the present invention. As can be seen, the device receives workload in the form of one or more polygonal primitives and processes each one through the device modules, which include a bounding box module, a triangle translation module, an edge equations module, and a bound computation module. The output from the bound computation module is then provided to one of the rasterizer process paths (slow or fast, in this example case). The output of the rasterization process, regardless of the path selected, can be provided to the display device (or any other suitable output device, such as a memory or printer). As will be further appreciated, other embodiments may include different degrees integration, and the example embodiment depicted was selected for ease of description. The polygonal primitive received in this example embodiment can be, for example, a triangle, but it could be any other polygonal shape that can be divided into two or more triangles. In any case, each triangle received can then be processed through the device, as will now be discussed with further reference to FIG. 3.

The bounding box module is programmed or otherwise configured to calculate 301 the bounding box of the triangle, and the triangle translation module is programmed or otherwise configured to translate 303 the triangle from the three-dimensional realm to the two-dimensional realm. To further explain, assume the following notations: given the number N, Bits(N) is the number of bits needed to represent N; N.i is the number of bits needed to represent the integer part of N; and N.f is the number of bits needed to represent the fractional part of N. For a given triangle edge, the line equation that can be used is of the form $Ax+By=C$, and the half-plane test is defined by the predicate $Ax+By \geq C$, where A, B, C are calculated from the triangle edge and x, y are taken from the tested sample point. The integer parts x.i and y.i are dependent on the triangle's pixel aligned bounding box (minX, minY→maxX,maxY) as calculated at 301, and these values can be reduced by translating the coordinate system for this triangle by (−minX, −minY) at 303, which effectively moves the bounding box minimal point to the origin. The minimal and maximal values of the x and y coordinates define the bounding box (at 301), and the translation of the triangle and sample point is by the minimal values of the bounding box (at 303), in accordance with an embodiment.

The edge equations module is programmed or otherwise configured to derive 305 the edge equations of the triangle. As previously explained, for a given triangle edge, the line equation that can be used is of the form Ax+By=C, and the half-plane test is defined by the predicate Ax+By≥C, where A, B, C are calculated from the triangle edge and x, y are taken from the tested sample point. In accordance with one example embodiment, the bound sought is on the value of Bits(Ax+By). Notice that in this equation A and B are fixed for a given triangle edge. Also notice that the fractional parts x.f and y.f are taken from a small fixed set, derived from the sampling scheme of the current draw.

The bound computation module is programmed or otherwise configured to calculate 307 the bound on the bits used for each triangle edge. In accordance with one example embodiment, the bound can be formulated as follows:

$$1+\max(\text{Bits}(A.i)+\text{Bits}(\max X-\min X), \text{Bits}(B.i)+\text{Bits}(\max Y-\min Y))+\max(\text{Bits}(A.f)+\max(\text{Bits}(x.f)), \text{Bits}(B.f)+\max(\text{Bits}(y.f)))$$

where the top expressions 'max(Bits(A.i)+Bits(maxX−minX),Bits(B.i)+Bits(maxY−minY))' relate to the integer part, and the bottom expressions '+max(Bits(A.f)+max(Bits(x.f)),Bits(B.f)+max(Bits(y.f)))' relate to the fractional part. For each triangle received (or derived from a polygonal shape received), this bound is calculated for all three edges of that triangle. Thus, each triangle edge will have three bounds, each identifying the number of bits associated with processing that edge.

Once the bound is computed for all three edges of a given triangle, the bound computation module (or other module) is further configured to identify 309 the maximal value ($\text{Bound}_{Max}$), and to determine 311 whether the bound is less than or equal to the given bit operation threshold ($\text{BitOp}_{Threshold}$) in accordance with the example embodiment shown. If so, the faster processing path can be used as indicated at 315; otherwise, if the bound is greater than the given bit operation threshold, then the slower processing path can be used as indicated at 313. For example, if the three edge bounds are respectively 17, 21 and 20 bits (as computed for a given triangle in 307), then the maximal value would be 21 bits. In such an example case, if the bit operation threshold is 32 bits, then 21 bits is less than or equal to 32, and the fast path (32-bit operations path) can be used to rasterize that triangle. If the maximal value is, for instance, 33 bits, or otherwise greater than the bit operation threshold (32 bits, for example), then the slower path (40-bit or 64-bit operations path) can be used to rasterize that triangle. As will be appreciated in light of this disclosure, each triangle typically covers multiple sample points on the screen, so actions that happen once per triangle will occur at a lower frequency than actions than actions that happen once per sample point. As such, those per-triangle actions are more efficient with respect to performance. Thus, actions at 301, 303, 305, 307, 309, and 311 may be performed once per triangle in accordance with an embodiment, and therefore will have a relatively small impact in terms of additional processing time.

As will be appreciated in light of this disclosure, the various functional modules described herein can be implemented, for example, in any suitable programming language (e.g., C, C++, objective C, custom or proprietary instruction sets, etc), and encoded on one or more machine readable mediums, that when executed by one or more processors, carry out reduced bitcount polygonal rasterization as described herein. Other embodiments can be implemented, for instance, with gate-level logic or an application specific integrated circuit (ASIC) or chip set or other such purpose built logic, or a microcontroller having input/output capability (e.g., inputs for receiving user inputs and outputs for directing other components) and a number of embedded routines for carrying out graphics workload processing. In short, the various functional modules can be implemented in hardware, software, firmware, or a combination thereof, and any such variation may be used in conjunction with a reduced bitcount polygonal rasterization scheme as described herein. One specific embodiment is implemented as a system-on-chip, which may include one or more embedded software routines and processing hardware including that for executing reduced bitcount polygonal rasterization, for example. Another embodiment is implemented as a graphics card. Another embodiment may be implemented as software rasterizer.

A rasterizer configured in accordance with one embodiment can be detected, for example, using two simple synthetic tests. The first test will rasterize a large set of relatively small triangles, so as trigger use of the fast process (e.g., 32 bit) path. The second test will rasterize an identical amount of samples covered by much larger triangles, which will be unable to use the fast process path as their line equations will have large coefficients. If, for example, the second test needs more time to complete for a software rasterizer, or more power for a hardware rasterizer, then this indicates usage of a path selection process for smaller triangles as provided herein.

Figure 4:
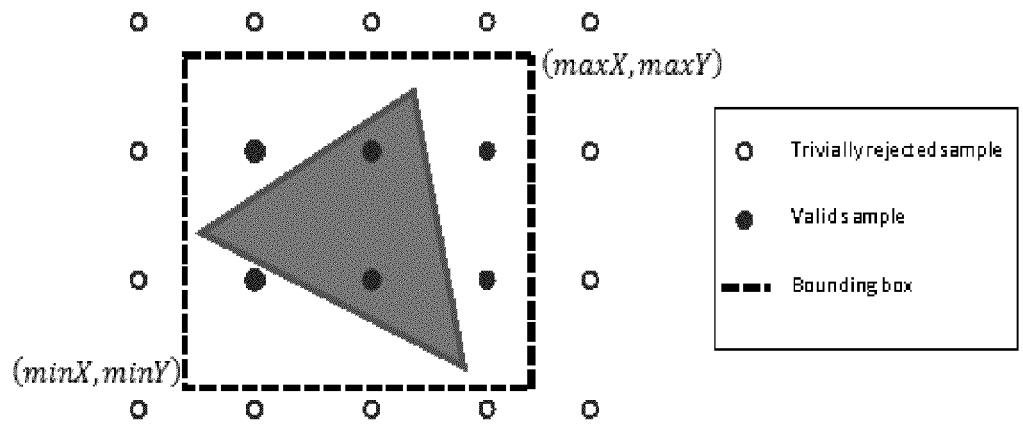
FIG. 4 illustrates a bounding box about a given polygon and the valid samples to be rasterized, in accordance with an embodiment of the present invention.
Figure 5:
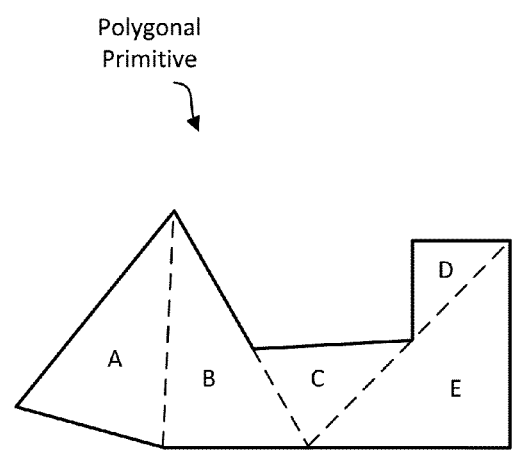
FIG. 5 illustrates an example polygonal primitive that can be segmented into triangles that can be processed in accordance with an embodiment of the present invention.

FIG. 4 illustrates a bounding box about a given polygon and the valid samples to be rasterized, in accordance with an embodiment of the present invention. As can be seen, the given polygon is a triangle. The bounding box computed per 301 is shown with a dashed line. As previously explained, the minimal and maximal values of the x and y coordinates define the bounding box (minX,minY→maxX,maxY). As can be further seen, the sample points that fall outside the bounding box can be trivially rejected, while samples in the box may be considered valid subjected to half-plane testing. FIG. 5 illustrates an example polygonal primitive that can be segmented into triangles that can be processed in accordance with an embodiment of the present invention. As can be seen, this particular example primitive is divided into triangles A through E. Each of these triangles can be processed through a multi-path rasterizer as described herein.

To further illustrate, consider the following detailed example. Assume a given triangle is received that has a single edge with the following values: A=16.5, B=3.125; maxX=7, minX=2; and maxY=3, minY=1. Further assume that all samples are in pixel centers (no multi-sample anti-aliasing). To calculate the bound for the single edge, then:

$\text{Bits}(A.i)=\text{Bits}(16)=5;$ $\text{Bits}(A.f)=\text{Bits}(0.5)=1;$ $\text{Bits}(B.i)=\text{Bits}(3)=2;$ $\text{Bits}(B.f)=\text{Bits}(0.125)=3;$ $\text{Bits}(\max X-\min X)=\text{Bits}(5)=3;$ $\text{Bits}(\max Y-\min Y)=\text{Bits}(2)=2;$ $\max(\text{Bits}(x.f))=\text{Bits}(0.5)=1;$ and $\max(\text{Bits}(y.f))=\text{Bits}(0.5)=1.$ Thus, the bound can then be computed to be: 1+max(5+3, 2+2)+max(1+1, 3+1)=13 bits. As previously explained, this bound can be calculated for every edge of each triangle, and the maximal value is taken, in accordance with an embodiment. The maximal value can then be compared against to bit threshold to determine if that particular triangle can be processed on the fast path (or the slow path). In a more general sense, the determination can be used to identify one of multiple available processing paths (e.g., fast/slow paths; encrypted/non-encrypted paths; processor_1/processor_2 paths, etc).

Example System

Figure 6:
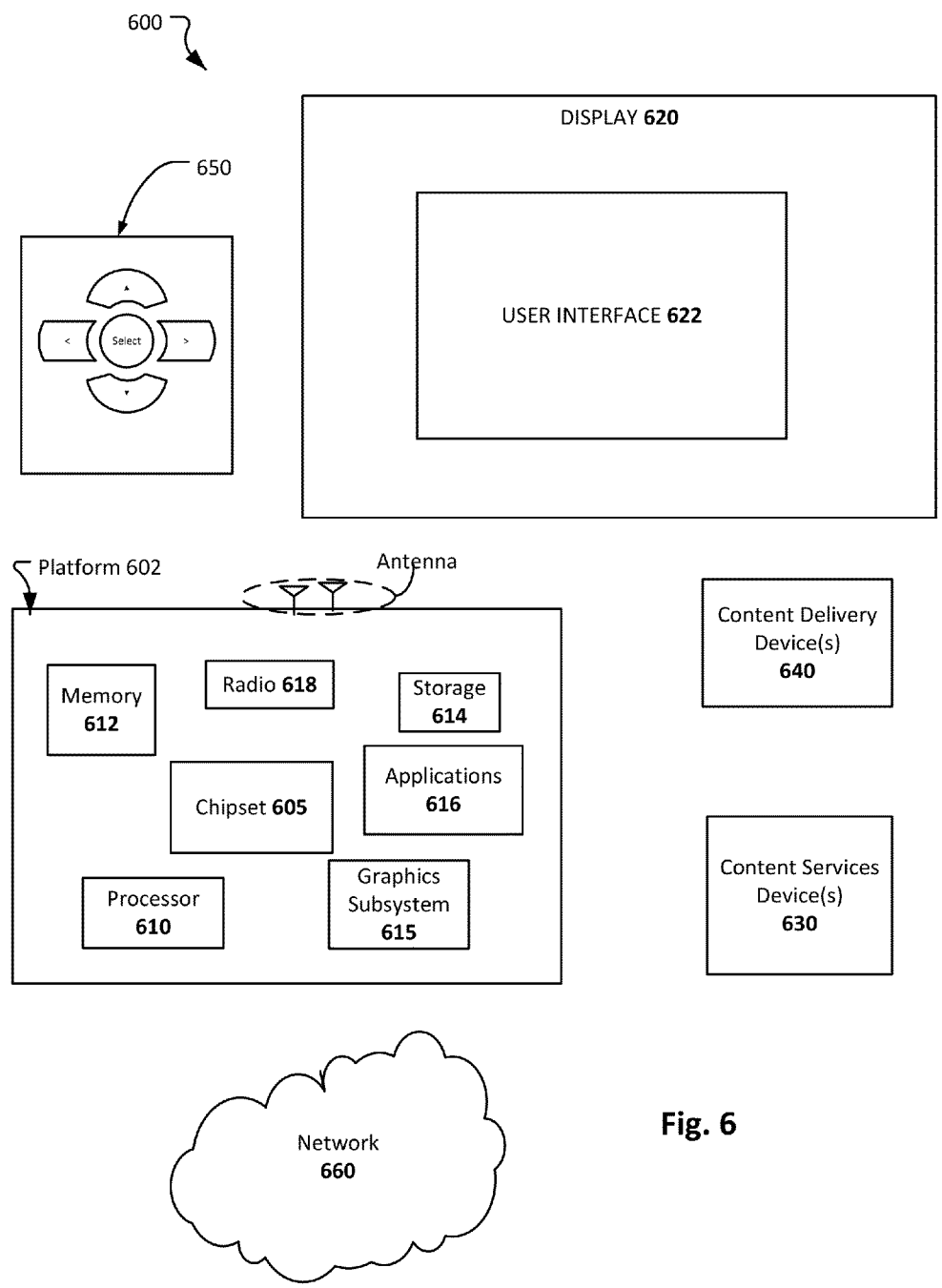
FIG. 6 illustrates a media system configured in accordance with an embodiment of the present invention.

FIG. 6 illustrates an example system 600 that may execute reduced bitcount polygonal rasterization as described herein as described herein, in accordance with some embodiments. In some embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing rasterization operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques described herein (including rasterization, etc) may be implemented in various hardware architectures. For example, reduced bitcount polygonal rasterization functionality may be integrated within a graphics and/or video chipset. Alternatively, a discrete reduced bitcount polygonal rasterization processor may be used. In still another embodiment, the graphics and/or video functions including reduced bitcount polygonal rasterization may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display. Display 620 may comprise, for example, a liquid crystal display (LCD) screen, electrophoretic display (EPD or liquid paper display, flat panel display, touch screen display, television-like device, and/or a television. Display 620 may be digital and/or analog. In some embodiments, display 620 may be a holographic or three-dimensional display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the claimed invention. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the claimed invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using reduced bitcount polygonal rasterization techniques as described herein). The embodiments, however, are not limited to the elements or context shown or described in FIG. 6.

Figure 7:
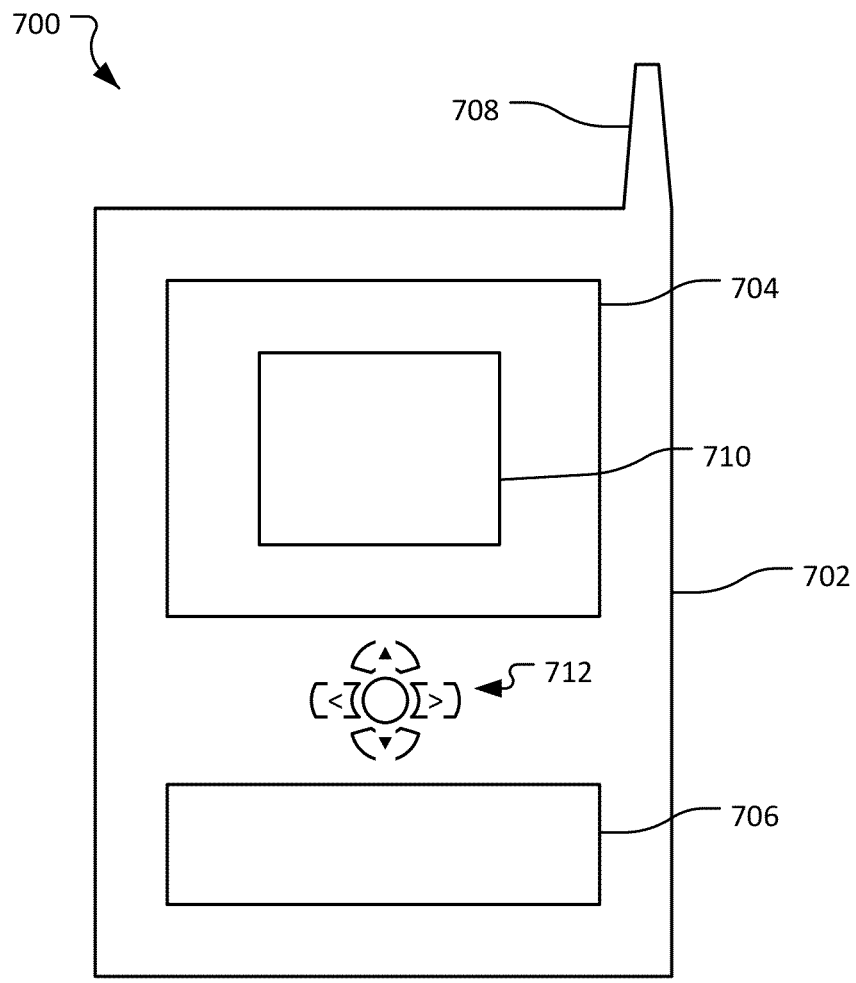
FIG. 7 illustrates a mobile computing system configured in accordance with an embodiment of the present invention.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present invention. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays. The embodiments are not limited in this context.

Numerous embodiments will be apparent, and features described herein can be combined in any number of configurations. One example embodiment of the present invention provides a device that includes a bounding box module configured to calculate a bounding box of a given polygonal primitive describing a three-dimensional scene, the polygon polygonal primitive represented as one or more triangles. The device further includes a translation module configured to translate each triangle from the three-dimensional realm to the two-dimensional realm, and an edge equations module configured to derive edge equations of each triangle. The device further includes a bound computation module configured to calculate a bound on bits used for each edge of each triangle, and identify an edge bound having a maximal value for each triangle. In some cases, if the maximal edge bound value for a given triangle is less than or equal to a given threshold then that triangle is processed on a first process path, and if the maximal edge bound value for the given triangle is greater than the given threshold then that triangle is processed on a second process path that is different from the first process path. In some cases, the first process path is configured to process N-bit rasterization operations, and the second process path is configured to process M-bit rasterization operations. In some specific cases, for example, the bound computation module is further configured to determine whether the maximal edge bound value for each triangle is less than or equal to the given bit operation threshold. In one such case, if the bound computation module determines the maximal edge bound value for a given triangle is less than or equal to the given bit operation threshold, then that triangle is processed on a lower bit count process path. In another such case, if the bound computation module determines the maximal edge bound value for a given triangle is greater than the given bit operation threshold, then that triangle is processed on a higher bit count process path. In some cases, the bound computation module is configured to calculate the bound on the bits used using the following formula: $1+\max(\text{Bits}(A.i)+\text{Bits}(\max X-\min X),\text{Bits}(B.i)+\text{Bits}(\max Y-\min Y))+\max(\text{Bits}(A.f)+\max(\text{Bits}(x.f)),\text{Bits}(B.f)+\max(\text{Bits}(y.f)))$, where the expressions '$\max(\text{Bits}(A.i)+\text{Bits}(\max X-\min X),\text{Bits}(B.i)+\text{Bits}(\max Y-\min Y))$' relate to an integer part of the bound of a given triangle edge, and the expressions '$+\max(\text{Bits}(A.f)+\max(\text{Bits}(x.f)),\text{Bits}(B.f)+\max(\text{Bits}(y.f)))$' relate to a fractional part of the bound of that triangle edge. In some cases, the device is a rasterizer. Numerous variations will be apparent. For instance, another embodiment provides a media processing system comprising the device as variously defined in this paragraph. Another embodiment of the present invention provides a mobile computing system comprising the media processing system. Another embodiment provides a system-on-chip (or chip set) comprising the device as variously defined in this paragraph.

Another embodiment of the present invention provides a rasterizer system. The system includes a bounding box module configured to calculate a bounding box of a given polygonal primitive describing a three-dimensional scene, the polygon polygonal primitive represented as one or more triangles. The system further includes a translation module configured to translate each triangle from the three-dimensional realm to the two-dimensional realm, and an edge equations module configured to derive edge equations of each triangle. The system further includes a bound computation module configured to calculate a bound on bits used for each edge of each triangle, and identify an edge bound having a maximal value for each triangle. If the maximal edge bound value for a given triangle is less than or equal to a bit operation threshold, then that triangle is processed on a lower bit count process path, and if the maximal edge bound value for a given triangle is greater than the bit operation threshold, then that triangle is processed on a higher bit count process path. In some specific such example cases, the bit operation threshold is 32 bits. In some cases, the bound computation module is configured to calculate the bound on the bits used using the following formula: $1+\max(\text{Bits}(A.i)+\text{Bits}(\max X-\min X),\text{Bits}(B.i)+\text{Bits}(\max Y-\min Y))+\max(\text{Bits}(A.f)+\max(\text{Bits}(x.f)),\text{Bits}(B.f)+\max(\text{Bits}(y.f)))$, where the expressions '$\max(\text{Bits}(A.i)+\text{Bits}(\max X-\min X),\text{Bits}(B.i)+\text{Bits}(\max Y-\min Y))$' relate to an integer part of the bound of a given triangle edge, and the expressions '+max(Bits(A.f)+max(Bits(x.f)),Bits(B.f)+max(Bits(y.f)))' relate to a fractional part of the bound of that triangle edge. Another related embodiment provides a mobile computing system that includes the rasterizer system.

Another embodiment of the present invention provides a method. The method includes calculating a bounding box of a given polygonal primitive describing a three-dimensional scene, the polygon polygonal primitive represented as one or more triangles. The method further includes translating each triangle from the three-dimensional realm to the two-dimensional realm, and deriving edge equations of each triangle. The method further includes calculating a bound on bits used for each edge of each triangle, and identifying an edge bound having a maximal value for each triangle. In some cases, if the maximal edge bound value for a given triangle is less than or equal to a given threshold then that triangle is processed on a first process path, and if the maximal edge bound value for the given triangle is greater than the given threshold then that triangle is processed on a second process path that is different from the first process path. In one such case, the first process path is configured to process N-bit rasterization operations, and the second process path is configured to process M-bit rasterization operations. In some specific cases, for instance, the method includes determining whether the maximal edge bound value for each triangle is less than or equal to a given bit operation threshold. In some specific example cases, if the maximal edge bound value for a given triangle is less than or equal to a given bit operation threshold, then the method further comprising processing that triangle on a lower bit count process path. In one such specific example case, if the maximal edge bound value for the given triangle is greater than the given bit operation threshold, then the method further comprising processing that triangle on a higher bit count process path.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A device, comprising:
hardware circuitry comprising a bounding box module configured to calculate a bounding box of a given polygonal primitive describing a three-dimensional scene, the polygon polygonal primitive represented as one or more triangles;
hardware circuitry comprising a translation module configured to translate each triangle from the three-dimensional realm to the two-dimensional realm;
hardware circuitry comprising an edge equations module configured to derive edge equations of each triangle; and
hardware circuitry comprising a bound computation module configured to calculate a bound on bits used for each edge of each triangle, and identify an edge bound having a maximal value for each triangle, wherein the bound computation module is further configured to determine whether the maximal edge bound value for each triangle is less than or equal to a given bit operation threshold.

2. The device of claim 1 wherein the device is at least part of a hardware graphics pipeline.

3. The device of claim 1 wherein if the bound computation module determines the maximal edge bound value for a given triangle is less than or equal to the given bit operation threshold, then that triangle is processed on a lower bit count process path.

4. The device of claim 3 wherein if the bound computation module determines the maximal edge bound value for a given triangle is greater than the given bit operation threshold, then that triangle is processed on a higher bit count process path.

5. The device of claim 1 wherein if the maximal edge bound value for a given triangle is less than or equal to a given threshold then that triangle is processed on a first process path, and if the maximal edge bound value for the given triangle is greater than the given threshold then that triangle is processed on a second process path that is different from the first process path.

6. The device of claim 5 wherein the first process path is configured to process N-bit rasterization operations, and the second process path is configured to process M-bit rasterization operations.

7. The device of claim 1 wherein the bound computation module is configured to calculate the bound on the bits used using the following formula:

$$1+\max(\text{Bits}(A.i)+\text{Bits}(\max X-\min X), \text{Bits}(B.i)+\text{Bits}(\max Y-\min Y))+\max(\text{Bits}(A.f)+\max(\text{Bits}(x.f)), \text{Bits}(B.f)+\max(\text{Bits}(y.f)))$$

where the expressions 'max(Bits(A.i)+Bits(maxX−minX), Bits(B.i)+Bits(maxY−minY))' relate to an integer part of the bound of a given triangle edge, and the expressions '+max(Bits(A.f)+max(Bits(x.f)),Bits(B.f)+max(Bits(y.f)))' relate to a fractional part of the bound of that triangle edge, and wherein:
the given triangle edge is represented by the line equation Ax+By=C, and the half-plane test is defined by the predicate Ax+By≥C, where A, B, C are calculated from the triangle edge and x, v are taken from a tested sample point of a current draw;
given a number N to represent A or B, Bits(N) is the number of bits needed to represent N;
N.i is the number of bits needed to represent the integer part of N;
N.f is the number of bits needed to represent the fractional part of N;
fractional parts x.f and y.f are taken from a fixed set derived from a sampling scheme of draw current draw;
minX and minY are the minimal values of the x and y coordinates, respectively, of the bounding box;
maxX and maxY are the maximal values of the x and y coordinates, respectively, of the bounding box; and
max(result1,result2) is the larger one of result1 or result2.

8. A media processing system comprising the device of claim 1.

9. A mobile computing system comprising the media processing system of claim 8.

10. A system-on-chip comprising the device of claim 1.

11. The device of claim 1 wherein the device is a rasterizer.

12. A One or more non-transitory machine readable mediums encoded with instructions that when executed by one or more processors, carry out a process for reduced bitcount polygonal rasterization, the process comprising:
calculating a bounding box of a given polygonal primitive describing a three-dimensional scene, the polygon polygonal primitive represented as one or more triangles;
translating each triangle from the three-dimensional realm to the two-dimensional realm;
deriving edge equations of each triangle; and calculating a bound on bits used for each edge of each triangle, and identify an edge bound having a maximal value for each triangle;

wherein if the maximal edge bound value for a given triangle is less than or equal to a bit operation threshold, then that triangle is processed on a lower bit count process path; and wherein if the maximal edge bound value for a given triangle is greater than the bit operation threshold, then that triangle is processed on a higher bit count process path.

13. The one or more machine readable mediums of claim 12 wherein the bit operation threshold is 32 bits.

14. The one or more machine readable mediums of claim 12 wherein calculating the bound on the bits used using the following formula:

$$1+\max(\text{Bits}(A.i)+\text{Bits}(\max X-\min X), \text{Bits}(B.i)+\text{Bits}(\max Y-\min Y))+\max(\text{Bits}(A.f)+\max(\text{Bits}(x.f)), \text{Bits}(B.f)+\max(\text{Bits}(y.f)))$$

where the expressions '$\max(\text{Bits}(A.i)+\text{Bits}(\max X-\min X), \text{Bits}(B.i)+\text{Bits}(\max Y-\min Y))$' relate to an integer part of the bound of a given triangle edge, and the expressions '$+\max(\text{Bits}(A.f)+\max(\text{Bits}(x.f)), \text{Bits}(B.f)+\max(\text{Bits}(y.f)))$' relate to a fractional part of the bound of that triangle edge, and wherein:

the given triangle edge is represented by the line equation $Ax+By=C$, and the half-plane test is defined by the predicate $Ax+By \geq C$, where A, B, C are calculated from the triangle edge and x, v are taken from a tested sample point of a current draw;

given a number N to represent A or B, Bits(N) is the number of bits needed to represent N;

N.i is the number of bits needed to represent the integer part of N;

N.f is the number of bits needed to represent the fractional part of N;

fractional parts x.f and y.f are taken from a fixed set derived from a sampling scheme of draw current draw;

minX and minY are the minimal values of the x and y coordinates, respectively, of the bounding box;

maxX and maxY are the maximal values of the x and y coordinates, respectively, of the bounding box; and max(result1,result2) is the larger one of result1 or result2.

15. A mobile computing device comprising the one or more machine readable mediums of claim 12.

16. A method, comprising:

calculating a bounding box of a given polygonal primitive describing a three-dimensional scene, the polygon polygonal primitive represented as one or more triangles;

translating each triangle from the three-dimensional realm to the two-dimensional realm;

deriving edge equations of each triangle;

calculating a bound on bits used for each edge of each triangle;

identifying an edge bound having a maximal value for each triangle; and determining whether the maximal edge bound value for each triangle is less than or equal to a given bit operation threshold.

17. The method of claim 16 wherein the bit operation threshold is 32 bits.

18. The method of claim 16 wherein if the maximal edge bound value for a given triangle is less than or equal to a given bit operation threshold, then the method further comprising processing that triangle on a lower bit count process path.

19. The method of claim 18 wherein if the maximal edge bound value for the given triangle is greater than the given bit operation threshold, then the method further comprising processing that triangle on a higher bit count process path.

20. The method of claim 16 wherein if the maximal edge bound value for a given triangle is less than or equal to a given threshold then that triangle is processed on a first process path, and if the maximal edge bound value for the given triangle is greater than the given threshold then that triangle is processed on a second process path that is different from the first process path.

21. The method of claim 20 wherein the first process path is configured to process N-bit rasterization operations, and the second process path is configured to process M-bit rasterization operations.

* * * * *